June 24, 1952 — F. L. GATCHET — 2,601,672

FERTILIZER DISSOLVING AND SPRAYING DEVICE

Filed Aug. 20, 1949

Inventor
FRANCIS L. GATCHET
By Cook & Robinson
Attorney

Patented June 24, 1952

2,601,672

UNITED STATES PATENT OFFICE 2,601,672

FERTILIZER DISSOLVING AND SPRAYING DEVICE

Francis L. Gatchet, Gardiner, Wash.

Application August 20, 1949, Serial No. 111,494

1 Claim. (Cl. 299—84)

This invention relates to improvements in spraying devices of that kind described and illustrated in U. S. Patent #1,848,708, issued to me on March 8, 1932, wherein there is described and illustrated a means for the dissolving and spraying of commercial fertilizer; the device being in the nature of a cap or closure, applied to a jar or container within which the dry fertilizer is held, and embodying, as a part thereof, a spray nozzle and a hose connection therefor, and there being openings in the cap from the spray nozzle passage into the container to permit a limited inlet of water for dissolving the fertilizer and for the outflow of solution into the water stream passing from the spray nozzle.

It is the principal object of this invention to provide a device of the above stated character wherein means is provided for creating a better turbulence of solution in the container, that will result in a better dissolution of the fertilizing material and a freer passage of the solution into the water stream.

More specifically stated, it is the principal object of the present invention to provide a device of the character above stated wherein a deflector is disposed in the path of the water jet as admitted to the container, whereby the water entering the container will be given a whirling action that will cause a quicker dissolution of material, a more effective mixing of water and solution, and a more even feeding of solution to the spray.

In accomplishing these and other objects of the invention, I have provided the improved details of construction, the preferred forms of which are illustrated in the accompanying drawings, wherein.

Figure 1:
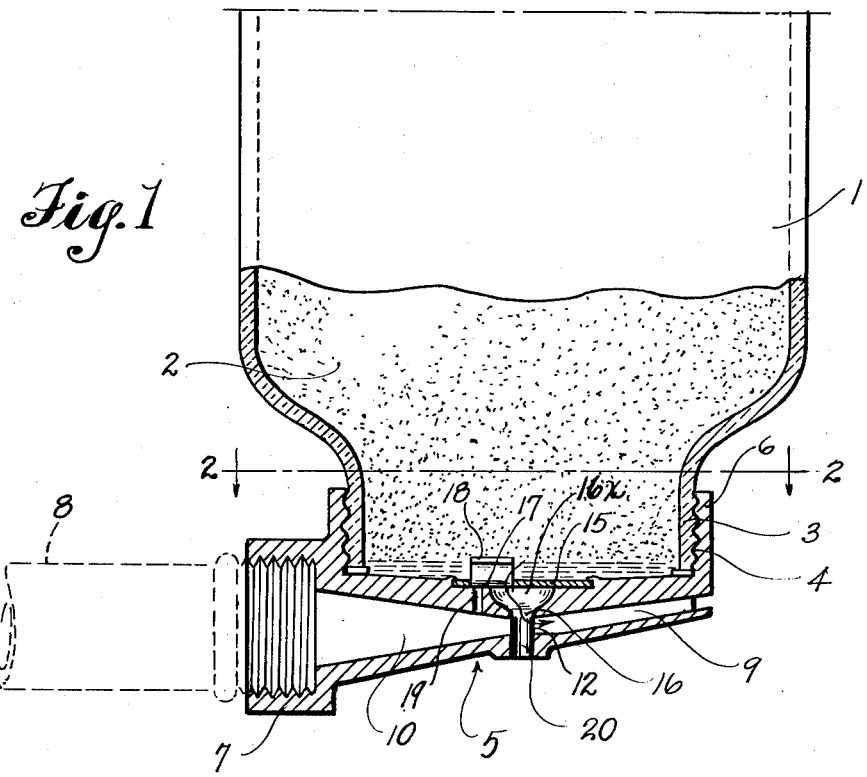
Fig. 1 is a vertical cross-sectional view of a portion of a jar, or container, to which a spraying device embodying the present improvements is functionally applied.

Referring more in detail to the drawings:

1 designates a container, here shown to be a glass jar of a common, well-known type, within which a quantity of fertilizer of granular form, designated at 2, is contained. Threaded onto the neck portion 3 of the jar, as at 4, is a closure member in the form of a cap designated in its entirety by reference numeral 5. While in functional use, the jar is inverted, as in Fig. 1, and the cap is applied thereto in an air- and water-tight connection to prevent leakage and insure the most satisfactory use of the device.

The cap 5 is preferably a one-piece plastic molding, or metal casting formed with a cylindrical flange 6, interiorly threaded for its application to the exteriorly threaded neck 3 of the jar. Integral with the cap is the spray-forming device comprising, at one side of the flange 6, an internally threaded socket or nipple portion 7 for the attachment of a garden hose, or the like, as indicated in dotted lines by numeral 8. At the other side there is a flattened and laterally flared spray nozzle 9. From the nipple 6 an inwardly tapered channel 10 leads into the smaller end of the spray nozzle through an orifice as designated at 12.

Figure 2:
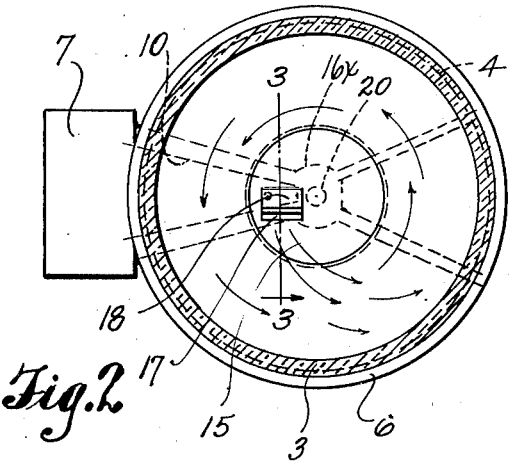
Fig. 2 is a horizontal section on line 2—2 in Fig. 1.
Figure 3:
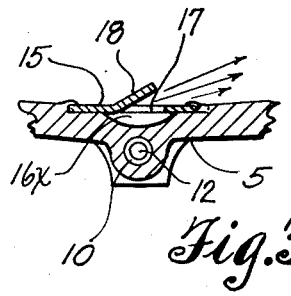
Fig. 3 is a cross-sectional detail, on line 3—3 in Fig. 2.

Set within the inner surface of the body of the cap, concentrically of the flange 6, is a flat metal plate 15 which serves as a cover or closure for an opening 16 from the inner end of the nozzle passage to the inside of the cap; this opening, as noted in Fig. 1, being flared at its upper end to substantial diameter, providing the chamber 16x. Formed in the plate 15, eccentrically thereof, is an opening 17; this being formed by cutting a rectangular piece of the metal free on three sides and then bending it upwardly to form an inclined deflecting baffle 18 as best shown in Fig. 3. This baffle overlies a part of the chamber 16x and also extends across a hole 19 that is directed upwardly from the passage 10 so that water delivered through passage or hole 19 against the baffle 18 will be so deflected into the lower end of the jar that there will be a whirling flow of material set up about the central axis of the jar neck as is indicated by the arrows in Fig. 2. The granular fertilizer material with which the water comes in contact will be dissolved quickly and the solution will then be sucked out through the inside edge of opening 17, through chamber 16x and opening 16 into the nozzle channel 9. The deflector serves also to prevent undissolved material from being drawn into the outlet.

In order that air may be admitted to the container as the fertilizer is dissolved and withdrawn, and also to give a better form of spray, I provide the outer wall of the cap, with a small air port 20 centrally thereof and opening into the inner end of the spray nozzle channel opposite passage 16, as noted in Fig. 1.

With the device so constructed, it is used as follows: First, the container or jar is filled with the dry, granular fertilizer material. The spray cap 5 is then threaded and tightened on to the neck of the jar, and a hose 8 is attached to the nipple 7. When water is delivered under pressure through the hose, the jar is inverted as in Fig. 1 and the fertilizer material, as it is dissolved by water entering through hole 19 and opening 17, is sucked out through the inside of opening 17 and hole 16 into the spray nozzle passage 9 and is there mixed with the spray water. The disposition of the baffle 18 eccentrically of the jar axis, causes a whirling turbulence to be created in the base of the jar, and an even and more satisfactory dissolution of the material and better withdrawal is effected.

Having thus described my invention, what I claim as new therein and desire to secure by Letters Patent is:

A device of the character described comprising a cap having a bottom wall equipped with an annular, internally threaded flange adapted for threaded application to the neck portion of a container to secure the cap for the gravity feeding of material thereinto from the inverted container, and a spray device integrally formed with the bottom wall of the cap at the underside thereof and comprising a water supply channel and a spray channel; said channels being in alignment diametrically of the cap; said bottom wall of the cap having a mixing chamber, formed concentrically therein adjacent its upper surface and having an air port in the axial center of the cap opening from the bottom thereof into the base of the chamber, a plate applied to the cap wall and overlying the said mixing chamber and extended beyond in periphery; said water supply channel being equipped for hose connection at its outer end and tapered to its discharge end and there opening into the said air port, and said spray channel having its inner end opening into the air port to receive the water discharged from the supply channel, and diverging to its outer end, said cover plate for the chamber having a partially detached tongue bent upwardly therefrom as an angular baffle, and providing an outlet from the container into the mixing chamber, and there being a water hole leading from the water supply channel into the opening as provided by the upbending of the tongue for delivery of water against the tongue for deflection thereby to create a whirling mixture in the cap.

FRANCIS L. GATCHET.

REFERENCES CITED

The following references are of record in the file of this patent:

UNITED STATES PATENTS

| Number | Name | Date |
|---|---|---|
| 1,737,377 | Koll | Nov. 26, 1929 |
| 1,769,266 | Lusier | July 1, 1930 |
| 1,848,708 | Gatchet | Mar. 8, 1932 |
| 2,131,796 | Day | Oct. 4, 1938 |
| 2,215,000 | Isenberg | Sept. 17, 1940 |
| 2,235,278 | Brunner | Mar. 18, 1941 |
| 2,286,828 | Prizer | June 16, 1942 |
| 2,293,390 | Hengesbach | Aug. 18, 1942 |